United States Patent
Kawai et al.

(10) Patent No.: US 9,579,610 B2
(45) Date of Patent: Feb. 28, 2017

(54) METHOD FOR MANUFACTURING SILICA MEMBRANE FILTER, AND SILICA MEMBRANE FILTER

(71) Applicant: NGK Insulators, Ltd., Nagoya (JP)

(72) Inventors: Masaaki Kawai, Nagoya (JP); Aya Miura, Nagoya (JP); Nobuhiko Mori, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 46 days.

(21) Appl. No.: 14/484,521

(22) Filed: Sep. 12, 2014

(65) Prior Publication Data
US 2015/0053605 A1 Feb. 26, 2015

Related U.S. Application Data

(63) Continuation of application No. PCT/JP2013/058445, filed on Mar. 22, 2013.

(30) Foreign Application Priority Data

Mar. 28, 2012 (JP) ................................ 2012-074454

(51) Int. Cl.
*B01D 39/00* (2006.01)
*B01D 39/14* (2006.01)
(Continued)

(52) U.S. Cl.
CPC ........... *B01D 71/70* (2013.01); *B01D 63/066* (2013.01); *B01D 67/0048* (2013.01);
(Continued)

(58) Field of Classification Search
CPC .............. B01D 2311/04; B01D 71/027; B01D 67/0046; B01D 67/0048
See application file for complete search history.

(56) References Cited

U.S. PATENT DOCUMENTS 5,869,152 A * 2/1999 Colon .................... B01J 20/287
  210/506
7,622,086 B2 * 11/2009 Takahashi ............ B01D 53/229
  422/211
(Continued)

FOREIGN PATENT DOCUMENTS

JP 06-170188 A1 6/1994
JP 10-249175 A1 9/1998
(Continued)

OTHER PUBLICATIONS

International Search Report and Written Opinion (Application No. PCT/JP2013/058445) dated May 28, 2013.
(Continued)

*Primary Examiner* — Ana Fortuna
(74) *Attorney, Agent, or Firm* — Burr & Brown, PLLC (57) ABSTRACT

A method for manufacturing a silica membrane filter includes performing, at least once, a fired membrane forming operation having a membrane forming step of applying, to a porous substrate, a precursor sol which is a sol of a silicon alcoxide including a p-tolyl group to form a precursor sol membrane, a drying step of drying the precursor sol membrane formed in the porous substrate to form a dried membrane, and a firing step of firing the dried membrane formed in the porous substrate to form a fired membrane, thereby preparing the silica membrane filter including the porous substrate and a silica membrane which is the fired membrane formed in the porous substrate, and a ratio of a total mass of the silica membrane to a total mass of the dried membrane is 38 mass % or more and 85 mass % or less.

9 Claims, 3 Drawing Sheets

(51) Int. Cl.
  *B29C 65/00* (2006.01)
  *B01D 29/46* (2006.01)
  *B01D 71/70* (2006.01)
  *B01D 63/06* (2006.01)
  *B01D 67/00* (2006.01)
  *B01D 71/02* (2006.01)
  *B01D 69/10* (2006.01)
  *B01D 69/12* (2006.01)

(52) U.S. Cl.
  CPC ..... *B01D 67/0083* (2013.01); *B01D 67/0088* (2013.01); *B01D 69/10* (2013.01); *B01D 69/12* (2013.01); *B01D 71/027* (2013.01); *B01D 2323/00* (2013.01); *B01D 2323/08* (2013.01); *B01D 2325/02* (2013.01)

(56) References Cited

U.S. PATENT DOCUMENTS

| | | | |
|---|---|---|---|
| 8,277,661 | B2 | 10/2012 | Sah et al. |
| 8,764,889 | B2 * | 7/2014 | Takagi ............... C04B 35/14 95/43 |
| 2008/0093008 | A1 | 4/2008 | Isomura et al. |
| 2009/0246114 | A1 | 10/2009 | Sah et al. |
| 2013/0112078 | A1 | 5/2013 | Takagi et al. |
| 2013/0126432 | A1 * | 5/2013 | Kreiter ............... B01D 61/027 210/640 |
| 2015/0053605 | A1 * | 2/2015 | Kawai ............... B01D 63/066 210/490 |

FOREIGN PATENT DOCUMENTS

| | | |
|---|---|---|
| JP | 10-323547 A1 | 12/1998 |
| JP | 2003-047831 A1 | 2/2003 |
| JP | 2008-173576 A | 7/2008 |
| JP | 2009-189934 A | 8/2009 |
| JP | 2009-189941 A | 8/2009 |
| JP | 2009-212017 A | 9/2009 |
| JP | 2009-233540 A1 | 10/2009 |
| JP | 2010-506700 A | 3/2010 |
| JP | 2010-069432 A1 | 4/2010 |
| WO | 2007/081212 A1 | 7/2007 |
| WO | 2011/145933 A1 | 11/2011 |
| WO | 2012/002181 A1 | 1/2012 |

OTHER PUBLICATIONS

Extended European Search Report, European Application No. 13768580.6, dated Apr. 28, 2015 (6 pages).

Japanese Office Action, Japanese Application No. 2014-507840, dated Sep. 13, 2016 (2 pages).

* cited by examiner

METHOD FOR MANUFACTURING SILICA MEMBRANE FILTER, AND SILICA MEMBRANE FILTER

BACKGROUND OF THE INVENTION

1. Field of the Invention

The present invention relates to a method for manufacturing a silica membrane filter in which it is possible to manufacture the silica membrane filter having a function of selectively separating an alcohol from a mixture of a hydrocarbon and the alcohol, and the silica membrane filter.

2. Description of Related Art

When a specific type of substance is only separated or concentrated from a fluid in which a plurality of types of substances are mixed, a separation membrane such as a silica membrane is used sometimes.

The silica membrane for use as separation membrane (hereinafter referred to simply as "silica membrane" sometimes) has a plurality of pores opened in both surfaces. In general, the silica membrane has a characteristic that it is easy to allow permeation of a substance having a small molecular size (e.g., water, carbon dioxide or the like). By utilizing the characteristics, the silica membrane has been used in a case where water is separated from a mixed liquid of the water and ethanol, a case where carbon dioxide is separated from a combustion exhaust gas, or the like (e.g., see Patent Documents 1 to 5). On the other hand, the conventional silica membrane also has a characteristic that it is difficult to pass an alcohol.

CITATION LIST

Patent Documents

[Patent Document 1] JP-A-2010-69432
[Patent Document 2] JP-A-2009-189941
[Patent Document 3] JP-A-H10-249175
[Patent Document 4] JP-A-H10-323547
[Patent Document 5] JP-A-H06-170188

SUMMARY OF THE INVENTION

Problem to be Solved by the Invention

A silica membrane is excellent in heat resistance, chemical resistance, shock resistance and the like, and hence it has been required that the silica membrane is also usable when an alcohol is selectively separated from a mixture of a hydrocarbon and the alcohol.

The present invention has been developed in view of the above problem. A main object of the present invention is to provide a method for manufacturing a silica membrane filter in which it is possible to manufacture the silica membrane filter having a function of selectively separating an alcohol from a mixture of a hydrocarbon and the alcohol, and the silica membrane filter.

Means for Solving the Problem

To achieve the abovementioned object, according to the present invention, there are provided a method for manufacturing a silica membrane filter and the silica membrane filter in the following.

According to a first aspect of the present invention, a method for manufacturing a silica membrane filter is provided, including performing, at least once, a fired membrane forming operation having a membrane forming step of applying, to a porous substrate, a precursor sol which is a sol of a silicon alcoxide including a p-tolyl group (para-tolyl group) to form a precursor sol membrane, a drying step of drying the precursor sol membrane formed in the porous substrate to form a dried membrane, and a firing step of firing the dried membrane formed in the porous substrate to form a fired membrane, thereby preparing the silica membrane filter including the porous substrate and a silica membrane which is the fired membrane formed in the porous substrate, wherein a ratio of a total mass of the silica membrane to a total mass of the dried membrane is 38 mass % or more and 85 mass % or less.

According to a second aspect of the present invention, the method for manufacturing the silica membrane filter according to the above first aspect is provided, wherein the mass of the silica membrane is from 0.5 to 7.2 $g/m^2$ per unit membrane area.

According to a third aspect of the present invention, the method for manufacturing the silica membrane filter according to the above first or second aspects is provided, wherein a firing temperature in the firing step is from 375 to 525° C.

According to a fourth aspect of the present invention, the method for manufacturing the silica membrane filter according to any one of the above first to third aspects are provided, wherein an average value of opening diameters in a plurality of pores opened in a surface of the porous substrate is from 2 to 20 nm.

According to a fifth aspect of the present invention, the method for manufacturing the silica membrane filter according to any one of the above first to fourth aspects are provided, wherein the silica membrane has at least one pore having a pore diameter of 1 nm or more.

According to a sixth aspect of the present invention, a silica membrane filter which is manufactured by the method for manufacturing the silica membrane filter according to any one of the above first to fifth aspects is provided.

According to a seventh aspect of the present invention, a silica membrane filter including a porous substrate and a silica membrane formed in the porous substrate, wherein a mass of the silica membrane is from 0.5 to 7.2 $g/m^2$ per unit membrane area.

In a method for manufacturing a silica membrane filter of the present invention, a silica membrane is formed by using, as a raw material, a sol of silicon alkoxide including a p-tolyl group, and furthermore, a ratio of a total mass of the silica membrane to a total mass of a dried membrane is 38 mass or more and 85 mass or less. Therefore, it is possible to manufacture the silica membrane filter capable of selectively separating an alcohol from a mixture of a hydrocarbon and the alcohol.

DETAILED DESCRIPTION OF THE INVENTION

An embodiment of the present invention will specifically be described with reference to the drawings. The present invention is not limited to the following embodiment, and change, modification or improvement can be added without departing from the scope of the present invention.

(1) Method for Manufacturing Silica Membrane Filter:

In a method for manufacturing a silica membrane filter of the present invention, a fired membrane forming operation "having a membrane forming step, a drying step and a firing step" is performed at least once, to prepare the silica membrane filter. Furthermore, a ratio of a total mass of a silica membrane to a total mass of a dried membrane is 38 mass % or more and 85 mass % or less. Furthermore, the membrane forming step is a step of applying, to a porous substrate, a precursor sol which is a sol of "a silicon alcoxide including a p-tolyl group" to form a precursor sol membrane. Furthermore, the drying step is a step of drying the precursor sol membrane formed in the porous substrate to form a dried membrane. Furthermore, the firing step is a step of firing the dried membrane formed in the porous substrate to form a fired membrane. Furthermore, the silica membrane filter includes the porous substrate and the silica membrane which is the fired membrane formed in the porous substrate. In one fired membrane forming operation, each of the membrane forming step, the drying step and the firing step is performed once.

As described above, in the method for manufacturing the silica membrane filter of the present invention, the silica membrane is formed by using, as a raw material, the sol of silicon alkoxide including the p-tolyl group. Furthermore, in the method for manufacturing the silica membrane filter of the present invention, the ratio of the total mass of the silica membrane to the total mass of the dried membrane is 38 mass % or more and 85 mass % or less. Therefore, it is possible to manufacture the silica membrane filter having a function of selectively separating an alcohol from a mixture of a hydrocarbon and the alcohol (an alcohol separating function).

In the method for manufacturing the silica membrane filter of the present invention, the ratio of the total mass of the silica membrane to the total mass of the dried membrane is 38 mass % or more and 85 mass % or less. Furthermore, the ratio of the total mass of the silica membrane to the total mass of the dried membrane is preferably 43 mass % or more and 73 mass % or less. When the ratio of the total mass of the silica membrane to the total mass of the dried membrane is lower than 38 mass %, a concentration of the alcohol in a permeation substance is unfavorably low, during the separation of the mixture of the hydrocarbon and the alcohol by use of the obtained silica membrane filter. When the ratio of the total mass of the silica membrane to the total mass of the dried membrane is higher than 85 mass %, a permeation speed of the permeation substance permeating through the membrane unfavorably decreases, during the separation of the mixture of the hydrocarbon and the alcohol by use of the obtained silica membrane filter. The total mass of the dried membrane is a value obtained by subtracting a mass of ethanol or the like evaporated during the formation of the dried membrane from an amount of the applied precursor sol. It is to be noted that when the fired membrane forming step is performed twice or more, the total mass of the dried membrane is a value obtained by adding up the dried membrane masses calculated every time. The total mass of the silica membrane is a value obtained by subtracting "the mass of the porous substrate before the formation of the silica membrane" from "the mass of the silica membrane filter after the formation of the silica membrane". It is to be noted that when the fired membrane forming step is performed twice or more, the total mass of the silica membrane is a value obtained by subtracting "the mass of the porous substrate before the formation of the silica membrane" from "the mass of the silica membrane filter after the formation of the silica membrane" after the last firing step.

There is not any special restriction on the mass of the dried membrane per unit area, but the mass is preferably from 0.5 to 15.0 g/m$^2$, further preferably from 0.8 to 11.7 g/m$^2$, and especially preferably from 1.0 to 10.9 g/m$^2$. When the mass is smaller than 0.5 g/m$^2$, the membrane cannot cover the surface of the porous substrate, and a defective portion is generated sometimes. When the mass is larger than 15.0 g/m$^2$, a shrinkage enlarges during the firing, and cracks are generated sometimes. The mass of the dried membrane per unit area is a value obtained by dividing the total mass of the dried membrane by an area where the dried membrane is formed.

Hereinafter, the method for manufacturing the silica membrane filter of the present invention will be described for each step.

(1-1) Membrane Forming Step:

The membrane forming step is the step of applying, to the porous substrate, the precursor sol which is the sol of "silicon alcoxide including the p-tolyl group" to form the precursor sol membrane.

There is not any special restriction on a method for preparing the precursor sol. An example of the method for preparing the precursor sol is the following method.

For example, a silica compound including the p-tolyl group and an organic solvent are first mixed and stirred, and then a catalyst and water are mixed and stirred to prepare a raw material. Afterward, the obtained raw material is stirred at 40 to 150° C. to hydrolyze and polycondense the silica compound, whereby the precursor sol can be obtained. The obtained precursor sol is the sol of "silicon alcoxide including the p-tolyl group". When the sol of "silicon alcoxide including the p-tolyl group" is used, the silica membrane filter including the silica membrane containing "the p-tolyl group" can be obtained.

Here, the raw material to prepare the precursor sol may include a substance other than "the silica compound including the p-tolyl group and the organic solvent", and may include a metal element other than silicon.

In the present description, the silica compound including the p-tolyl group is a compound containing one or two or more silicon atoms (Si) and further containing one or two or more p-tolyl groups in a molecular structure. Examples of the silica compound including the above p-tolyl group for use in the preparation of the precursor sol include p-tolyl trimethoxysilane, p-tolyl triethoxysilane, di-p-tolyl dimethoxysilane, and di-p-tolyl diethoxysilane. Furthermore, when the p-tolyl group is contained, an organic functional group other than the p-tolyl group, for example, a methyl group, an ethyl group or a phenyl group may be contained.

Examples of the above organic solvent to be contained in the precursor sol include the silica compound including the p-tolyl group, and alcohols, ethers, ketones, amides, aromatics and paraffins which are mixable with water. Examples of the organic solvent include ethanol, isopropanol, and N-methyl-2-pyrrolidone. Furthermore, each of the above organic solvents may be used alone, or any mixture of the above organic solvents may be used.

A sol concentration of the precursor sol is preferably from 0.1 to 10.0 mass % and further preferably from 1.0 to 5.0 mass %. When the sol concentration is lower than 0.1 mass %, there occurs the necessity that the number of fired membrane forming operations is increased to increase the number of times to form the membrane (the number of the membrane forming times) sometimes. When the sol concentration is higher than 10.0 mass %, there is the possibility that the precursor sol excessively adheres to the porous substrate to cause cracks during the firing and a drop of the permeation speed after the firing.

When the precursor sol is prepared, the catalyst is preferably used as described above so as to promote the hydrolysis of the silica compound including the p-tolyl group. Examples of the catalyst include an acid catalyst and an alkali catalyst. As the acid catalyst, for example, nitric acid, hydrochloric acid, sulfuric acid, phosphoric acid, acetic acid or the like is usable. Furthermore, as the alkali catalyst, for example, sodium hydrate, potassium hydroxide, ammonia or the like is usable.

As described above, the obtained precursor sol is applied to the porous substrate to form the precursor sol membrane. There is not any special restriction on a method of applying the precursor sol to the porous substrate, but examples of the method include a flow-down method, a dipping method, and a spin coating method.

The flow-down method is a method of allowing the precursor sol to flow downward due to its deadweight, so that the precursor sol is adhered onto the surface of the porous substrate.

When the precursor sol is adhered onto the porous substrate by the flow-down method, the precursor sol closes pores of the porous substrate in a short time while suitably receiving stress as compared with the dipping method or the spin coating method. As a result, in the silica membrane of the obtained silica membrane filter, its membrane thickness decreases, and pore diameters become suitable sizes to develop an alcohol selective permeation function.

Figure 1:
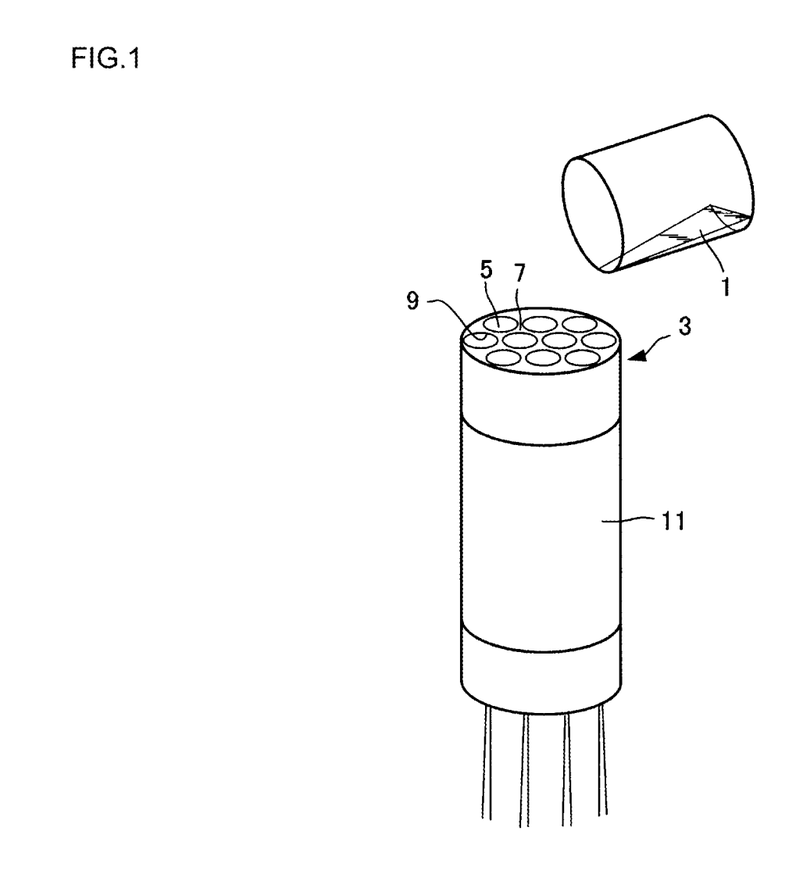
FIG. 1 is a schematic view showing how a membrane forming step in one embodiment of a method for manufacturing a silica membrane filter of the present invention is performed by a flow-down method.

The flow-down method will be described with reference to FIG. 1. FIG. 1 is a schematic view showing how the membrane forming step in the one embodiment of the method for manufacturing the silica membrane filter of the present invention is performed by the flow-down method. First, a circumferential surface of a porous substrate 3 is masked with a masking tape 11. The porous substrate 3 has a structure where cells 5, which become through channels for a fluid and extend from one end face to the other end face, are formed by partition walls 7. Next, the porous substrate 3 is held in a state where an extending direction of the cells 5 is turned to a vertical direction, and a precursor sol 1 is poured from an upper end face of the porous substrate 3 into the cells 5.

During that time, the precursor sol 1 first adheres to inner wall surfaces 9 of the cells 5 in the periphery of the upper end face of the porous substrate 3. Then, the precursor sol flows downward due to the deadweight while adhering to the inner wall surfaces 9, whereby the precursor sol covers the surfaces of the inner wall surfaces 9 in the form of a membrane while spreading from the upside to the downside of the inner wall surfaces 9 of the cells 5. Furthermore, when precursor sol completely covers the inner wall surfaces 9 to lower end portions thereof, the precursor sol which cannot adhere to the inner wall surfaces 9 is discharged from the lower end face of the porous substrate 3 to the outsides of the cells 5.

According to this flow-down method, the precursor sol does not easily penetrate into the pores of the porous substrate 3, and an excessively large amount of the precursor sol does not easily adhere to the inner wall surfaces 9. As a result, a thin membrane of the precursor sol can be formed on the inner wall surfaces 9. In this manner, when the thin membrane of the precursor sol is formed, the silica membrane filter having a high permeation flux can be obtained.

Furthermore, the dipping method is a method of immersing the porous substrate into the precursor sol stored in a container so that the precursor sol is adhered onto the surface of the porous substrate. When the precursor sol is adhered onto the porous substrate by the dipping method, the precursor sol can freely enter into the pores of the porous substrate as compared with the flow-down method. Therefore, the membrane thickness of the silica membrane in the resulting silica membrane filter easily increases. Furthermore, the precursor sol is easily excessively charged into the pores of the porous substrate. Consequently, there is a tendency that pore diameters of the silica membrane in the resulting silica membrane filter are slightly smaller than the suitable sizes to develop the alcohol selective permeation function.

Furthermore, the spin coating method is a method of supplying the precursor sol onto the porous substrate while rotating the porous substrate, so that the precursor sol is adhered onto the surface of the porous substrate. When the precursor sol is adhered onto the porous substrate by the spin coating method, it is possible to decrease the membrane thickness of the silica membrane in the resulting silica membrane filter in the same manner as in the flow-down method. However, in the spin coating method, the precursor sol is easily densely charged into the pores of the porous substrate by the stress during the rotation. Therefore, the pore diameters of the silica membrane easily become smaller than the suitable sizes to develop the alcohol selective permeation function in the same manner as in the dipping method. It is to be noted that in the spin coating method, a shape of the porous substrate is preferably a plate shape.

As the porous substrate, it is preferable to use a porous substrate made of a porous ceramic material including, as a main component, at least one of alumina, titania, silica, cordierite, zirconia, and mullite. In consequence, the porous substrate is excellent in heat resistance, chemical resistance, and shock resistance.

An average value of opening diameters in the plurality of pores opened in the surface of the porous substrate (an average pore diameter in the surface of the porous substrate) is preferably from 2 to 20 nm, further preferably from 2 to 15 nm, and especially preferably from 3 to 10 nm. In consequence, the thin silica membrane which does not have any defects can stably be formed without being peeled. When the average pore diameter is smaller than 2 nm, the precursor sol does not sufficiently penetrate into the porous substrate during the membrane formation, whereby no composite layer is formed and the silica membrane peels sometimes. When the average pore diameter is larger than 20 nm, the precursor sol excessively penetrates into the porous substrate, whereby the silica membrane excessively thickens sometimes. Furthermore, the defects are generated in the silica membrane sometimes. The average pore diameter in the surface of the porous substrate is a value measured by a method based on Kelvin equation. The value can be measured by using, for example, a pore diameter distribution measuring device (trade name: DYNAMIC PORE SIZE MEASUREMENT) manufactured by SRI International. In this case, a nitrogen gas is preferably used as a feed gas and n-hexane is preferably used as a condensable gas. It is to be noted that the above "average value of the opening diameters of the plurality of pores opened in the surface of the porous substrate (the average pore diameter in the surface of the porous substrate)" is an average value in "a portion in which the silica membrane is to be formed in the surface of the porous substrate". Therefore, the portion (the surface) in which the silica membrane is not to be formed is not included in "the surface of the porous substrate" when the above "average pore diameter in the surface of the porous substrate" is obtained.

Furthermore, the porous substrate may be a single layer structure or a multilayer structure.

There is not any special restriction on a shape of the porous substrate, but examples of the shape include a tubular shape of "a circular tube, a square tube or the like", a columnar shape of "a circular columnar, a square columnar or the like", and a plate-like shape of "a circular plate, a polygonal plate or the like". An example of the shape of the porous substrate is preferably a monolith shape, because a ratio of a surface area of the silica membrane to a volume of the silica membrane filter can be increased. When the porous substrate has the monolith shape, the precursor sol is preferably applied to the inner wall surface of each pore (cell) opened in the form of a lotus root. In consequence, it is possible to obtain the silica membrane filter in which the silica membrane is formed on the inner wall surfaces of the cells.

(1-2) Drying Step:

The drying step is the step of drying the precursor sol membrane formed in the porous substrate to form the dried membrane. There is not any special restriction on drying conditions, but heating is preferably performed at 0 to 100° C. for 15 minutes to two hours. There is not any special restriction on a device for use in the drying, but examples of the device include a blower, an electric furnace, and a microwave dryer.

(1-3) Firing Step:

The firing step is the step of firing the dried membrane formed in the porous substrate to form the fired membrane. There is not any special restriction on firing conditions. For example, a firing temperature is preferably from 375 to 525° C., further preferably from 390 to 520° C., and especially preferably from 400 to 500° C. According to such conditions of the firing temperature, a high alcohol separating function is compatible with a high permeation speed. When the firing temperature is lower than 375° C., the permeation speed lowers sometimes. When the firing temperature is higher than 525° C., the alcohol separating function deteriorates sometimes. Furthermore, the permeation speed lowers sometimes. Furthermore, a firing time is preferably from 30 minutes to five hours. The firing step can be performed in the atmosphere, an inert gas, a vacuum or the like. There is not any special restriction on a device for use in the firing, but examples of the device include an electric furnace, a gas furnace, and a microwave firing device.

(1-4) Fired Membrane Forming Operation:

The fired membrane forming operation is an operation in which the above "membrane forming step, drying step and firing step" form one cycle. When "the fired membrane forming operation is performed once", it is meant that each of the above "membrane forming step, drying step and firing step" is performed once, and "the porous substrate in which the fired membrane is formed" which is obtained in the last firing step is the silica membrane filter. Furthermore, when "the fired membrane forming operation is performed twice", it is meant that each of the above "membrane forming step, drying step and firing step" is performed once, and then each of the above "membrane forming step, drying step and firing step" is further performed once to obtain the silica membrane filter.

The fired membrane forming operation is preferably performed once to 20 times, further preferably performed twice to ten times, and especially preferably performed twice to six times. When the number of the fired membrane forming operations is in excess of 20, the membrane excessively thickens, and cracks are generated in the membrane sometimes.

(1-5) Silica Membrane Filter:

The silica membrane filter manufactured by the method for manufacturing the silica membrane filter of the present invention includes the porous substrate and the silica membrane which is the fired membrane formed in the porous substrate. When the silica membrane is disposed on the surface of the porous substrate, a strength of the silica membrane can be enhanced. Preferable conditions of the porous substrate are similar to preferable conditions of the porous substrate used in the method for manufacturing the silica membrane filter of the present invention. When the porous substrate has the monolith shape, the silica membrane is preferably formed on the inner wall surface of each of a plurality of through holes (cells) opened in the form of the lotus root as described above. In this case, the silica membrane filter is a structure where the silica membrane is formed on the inner wall surfaces of the cells of the porous substrate of the monolith shape.

A mass of the silica membrane constituting the resulting silica membrane filter is preferably from 0.5 to 7.2 $g/m^2$ and further preferably from 1.0 to 4.8 $g/m^2$ per unit membrane area. When the mass is smaller than 0.5 $g/m^2$, the alcohol separating function deteriorates sometimes. When the mass is larger than 7.2 $g/m^2$, the permeation speed of the permeation substance permeating through the membrane (the permeation speed when the permeation substance permeates through the membrane) decreases sometimes. The mass of the silica membrane constituting the silica membrane filter is the value obtained by subtracting "the mass of the porous substrate before the formation of the silica membrane" from "the mass of the silica membrane filter after the formation of the silica membrane". Furthermore, the mass per unit membrane area of the silica membrane constituting the silica membrane filter is a value obtained by dividing the total mass of the silica membrane constituting the silica membrane filter by an area of the silica membrane.

The silica membrane constituting the resulting silica membrane filter preferably has at least one pore having a pore diameter of 1 nm or more. When the membrane does not have any pore having the pore diameter of 1 nm or more at all, the permeation speed when the permeation substance permeates through the membrane decreases sometimes. It is presumed that the generation of the pores having the pore diameters of 1 nm or more is influenced by the pore diameters in the surface of the porous substrate, a pore distribution and a membrane forming method. Furthermore, the pores having the pore diameters of 1 nm or more are easily generated in the silica membrane when the average value of the opening diameters in the surface of the porous substrate (the average pore diameter in the surface of the porous substrate) is from 2 to 20 nm, and the membrane forming step is performed by the flow-down method. The pore diameters of the silica membrane are values measured by the method based on the Kelvin equation. The pore diameters can be measured by using, for example, the pore diameter distribution measuring device (trade name: DYNAMIC PORE SIZE MEASUREMENT) manufactured by SRI International.

Furthermore, the silica membrane is preferably disposed in a state where the membrane does not deeply penetrate from the surface of the porous substrate into the pores, from the viewpoint that the permeation flux of the substance permeation through the silica membrane is heightened.

Furthermore, the silica membrane preferably has "the p-tolyl group". That is, the silica membrane filter preferably includes the silica membrane having "the p-tolyl group". When the silica membrane contains "the p-tolyl group", there is the advantage that an alcohol selectivity is increased. It can be confirmed by Fourier transform infrared spectrometry (FT-IR) that the silica membrane has "the p-tolyl group".

(2) Silica Membrane Filter:

Next, the silica membrane filter of the present invention (a second silica membrane filter of the present invention) will be described. The second silica membrane filter of the present invention includes a porous substrate and a silica membrane formed in the porous substrate, and a mass of the silica membrane is from 0.5 to 7.2 $g/m^2$ per unit membrane area. The mass of the silica membrane per unit membrane area is a value obtained by the following method. At least 100 view fields of a cross section of the silica membrane are observed by a transmission type electron microscope, and an average value of membrane thicknesses is calculated. Then, a value obtained by multiplying "the average value of the membrane thicknesses", "a surface area of the silica membrane" and "a density of a precursor sol passed through a drying step and a firing step similar to those for the silica membrane, i.e., a fired sol obtained by the drying and the firing" is a mass of the silica membrane. Furthermore, the mass of the silica membrane per unit membrane area is a value obtained by dividing the mass of the obtained silica membrane by the above "surface area of the silica membrane". The above density of the fired sol can be measured by using, for example, a dry type automatic density meter (Accupyc 1330 manufactured by Shimadzu Corporation).

Preferable conditions of the porous substrate constituting the second silica membrane filter of the present invention are preferably similar to the preferable conditions of the porous substrate used in the above method for manufacturing the silica membrane filter of the present invention.

There is not any special restriction on a method for manufacturing the second silica membrane filter of the present invention, but the method is preferably the above manufacturing method of the present invention.

The second silica membrane filter of the present invention is a silica membrane filter manufactured by the above method for manufacturing the silica membrane filter of the present invention (a first silica membrane filter of the present invention), which has a mass of 0.5 to 7.2 $g/m^2$ per unit membrane area.

EXAMPLES

Hereinafter, examples of the present invention will be described in more detail, but the present invention is not limited to these examples.

Example 1

Preparation of Silica Membrane Filter

P-tolyl trimethoxysilane and ethanol were mixed and stirred at 4° C. to prepare a mixed solution in which p-tolyl trimethoxysilane and ethanol were sufficiently mixed. Next, an aqueous solution of nitric acid was added for hydrolysis little by little. The aqueous solution of nitric acid was added until a pH of the mixed solution reached 0.3, followed by stirring at 4° C. for one hour. Next, the mixed solution to which the aqueous solution of nitric acid had been added was stirred at 50° C. for three hours to obtain a reaction liquid. The pH of the mixed solution was measured by a compact pH meter (model: Twin pH B-212 type) of HORIBA, Ltd. Afterward, ethanol was added to dilute the whole reaction liquid so that a sol concentration of the reaction liquid was 2.0 mass % in terms of $SiO_2$, to obtain a precursor sol which was a sol of silicon alkoxide including a p-tolyl group.

Next, 160 ml of the precursor sol was measured and taken. Then, the precursor sol was allowed to flow downward into cells (through holes) of a monolithic ceramic substrate, from one end face of "the monolithic ceramic substrate (a porous substrate) having both end faces sealed with glass and having a diameter of 30 mm and a length of 160 mm". In consequence, the precursor sol was applied to inner wall surfaces of cells. An average pore diameter in the surfaces of the cells of the monolithic ceramic substrate (an average pore diameter of open ends of pores in the surface of the porous substrate (a portion to which the precursor sol was applied)) was 4 nm.

Next, the precursor sol was dried to form a dried membrane. Afterward, the monolithic ceramic substrate in which the dried membrane was formed was held at 550° C. (a firing temperature) for 1.3 hours to form a fired membrane. A fired membrane forming operation "from the above application of the precursor sol to a heat treatment" was repeated five times to prepare a silica membrane filter including a silica membrane containing the p-tolyl group.

For the obtained silica membrane filter, "pore diameter measurement of the silica membrane" and "a pervaporation test" were carried out by methods described in the following. The results are shown in Table 2. Furthermore, the above respective measured values were measured by methods described in the following. The respective measured values are shown in Tables 1, 2.

In Table 1, "a residual ratio of a dried sol after the firing" indicates a ratio of a total mass of the silica membrane to a total mass of the dried membrane. Furthermore, "a total mass of the fired membrane" is "the total mass of the silica membrane", and indicates a mass of the silica membrane per unit membrane area. "A total mass of an adhered sol after the dying" is "the total mass of the dried membrane". The column of "retention time" indicates a retention time (hour) of the firing temperature. The column of "sol concentration" indicates the sol concentration of the precursor sol, i.e., a converted value (a silica concentration) in a case where Si in the precursor sol is supposed to be all silica. The column of "No. of membrane forming times" indicate the number of repetitions of the fired membrane forming operation. The column of "average pore diameter of substrate surface" indicates an average value of opening diameters of pores in a portion to which the precursor sol is applied (a portion in which the silica membrane is formed) in the surface of the porous substrate (an average pore diameter in the surface of the porous substrate). In Table 2, a column of "silica membrane/pores of 1 nm or more" indicates whether or not the pores of 1 nm or more are observed by "the pore diameter measurement of the silica membrane". "Present" indicates that the silica membrane has the pores of 1 nm or more. "None" indicates that the silica membrane does not have the pores of 1 nm or more.

(Average Pore Diameter in Surface of Porous Substrate)

An average pore diameter in the surface of the porous substrate (the average pore diameter of the surface of the substrate) (nm) is measured by using a pore diameter distribution measuring device (trade name: DYNAMIC PORE SIZE MEASUREMENT) manufactured by SRI International. A nitrogen gas is used as a feed gas and n-hexane is used as a condensable gas. "The average pore diameter in the surface of the porous substrate" measured by the above device is a value measured by a method based on Kelvin equation.

(Residual Ratio of Dried Membrane after Firing)

The residual ratio (mass %) of the dried membrane after the firing is the ratio of the total mass of the silica membrane to the total mass of the dried membrane. The total mass of the dried membrane is a value obtained by subtracting a mass of ethanol or the like evaporated during the formation of the dried membrane from an amount of the applied precursor sol. The total mass of the silica membrane is a value obtained by subtracting "the mass of the porous substrate before the formation of the silica membrane" from "the mass of the silica membrane filter after the formation of the silica membrane".

(Mass of Silica Membrane)

The mass of the silica membrane (the mass of the silica membrane per unit area) (g/m$^2$) is a value obtained by dividing the total mass of the silica membrane by an area (a total area) of the silica membrane.

filter, a pressure was reduced from the side surface of the porous substrate at a vacuum degree of about 10 Torr, and permeated vapor flown outwardly from the side surface of the porous substrate was trapped by a trap cooled in liquid nitrogen. A total permeation flux was calculated from a mass of a liquid of the trapped permeated vapor. Furthermore, the liquid of the permeated vapor was analyzed by gas chromatography, and a composition of the permeated vapor was determined. The column of "ethanol permeation amount (kg/m$^2$·h)" of Table 2 indicates the permeation flux (kg/(m$^2$·hour)) of ethanol in the permeated vapor. Furthermore, the column of "permeated ethanol concentration (mass %)" of Table 2 indicates the concentration of ethanol in the permeated vapor. Furthermore, the column of "judgment" of Table 2 indicates the result of the pervaporation test. In the column of "judgment", "A" indicates that the result is most suitable, "B" indicates that the result is next suitable, and "C" indicates that the result is not preferable. Further specifically, "A" indicates that "the ethanol permeation amount" is 2.5 (kg/m$^2$·h) or more and "the permeated ethanol concentration" is 55 (mass %) or more. Furthermore, "B" indicates that "the ethanol permeation amount" is 2.0 (kg/m$^2$·h) or more and "the permeated ethanol concentration" is 50 (mass %) or more. Furthermore, "C" indicates that "the ethanol permeation amount" is smaller than 2.0 (kg/m$^2$·h) or "the permeated ethanol concentration" is smaller than 50 (mass %).

TABLE 1

|  | Residual ratio of dried sol after firing*1 [mass %] | Total mass of fired membrane [g/m$^2$] | Total mass of adhered sol after drying [g/m$^2$] | Firing temp. [° C.] | Retention time [h] | Sol concentration*2 [mass %] | No. of membrane forming times [times] | Average pore dia. of substrate surface [nm] |
|---|---|---|---|---|---|---|---|---|
| Example 1 | 38 | 4.4 | 11.6 | 550 | 1.3 | 2.0 | 5 | 4 |
| Example 2 | 85 | 3.4 | 4.0 | 350 | 0.5 | 2.0 | 2 | 5 |
| Example 3 | 67 | 2.0 | 3.0 | 400 | 1.0 | 1.0 | 2 | 9 |
| Example 4 | 66 | 7.2 | 10.9 | 400 | 1.0 | 5.0 | 6 | 12 |
| Example 5 | 71 | 3.6 | 5.1 | 400 | 1.0 | 2.0 | 4 | 4 |
| Example 6 | 72 | 2.8 | 3.9 | 400 | 1.0 | 2.0 | 2 | 5 |
| Example 7 | 61 | 2.3 | 3.8 | 400 | 1.0 | 2.0 | 1 | 2 |
| Example 8 | 73 | 4.8 | 6.6 | 375 | 1.0 | 2.0 | 2 | 5 |
| Example 9 | 43 | 3.9 | 9.1 | 525 | 1.0 | 2.0 | 4 | 6 |
| Example 10 | 69 | 1.4 | 2.0 | 400 | 1.0 | 0.7 | 2 | 3 |
| Example 11 | 43 | 1.1 | 2.6 | 450 | 4.0 | 1.0 | 2 | 3 |
| Example 12 | 45 | 0.5 | 1.1 | 400 | 1.5 | 0.2 | 3 | 2 |
| Example 13 | 66 | 2.3 | 3.5 | 400 | 1.0 | 1.0 | 2 | 20 |
| Example 14 | 64 | 6.8 | 10.6 | 400 | 1.0 | 5.0 | 6 | 1 |
| Example 15 | 65 | 4.3 | 6.6 | 400 | 1.0 | 0.2 | 20 | 4 |
| Comparative Example 1 | 90 | 3.2 | 3.6 | 300 | 1.0 | 2.0 | 1 | 6 |
| Comparative Example 2 | 30 | 2.8 | 9.3 | 700 | 1.0 | 2.0 | 6 | 5 |

*1(Residual ratio of dried sol after firing) = (total mass of tired membrane)/(total mass of adhered sol after drying)
*2Converted value in a case where it is supposed that a raw material is silica (the concentration of silica in the precursor sol)

(Pore Diameter Measurement of Silica Membrane)

The pore diameter measurement of the silica membrane (the judgment of the presence/absence of the pores of 1 nm or more) is performed as follows. The pore diameters (nm) of the silica membrane are measured by using a pore diameter distribution measuring device (trade name: DYNAMIC PORE SIZE MEASUREMENT) manufactured by SRI International. A nitrogen gas is used as a feed gas and n-hexane is used as a condensable gas. Furthermore, the presence/absence of the pores of 1 nm or more is confirmed.

(Pervaporation Test)

A mixed liquid of ethanol, o-xylene and n-octane (ethanol:o-xylene:n-octane=33:33:33 (mass ratio)) was prepared. The above mixed liquid at a temperature of 50° C. was allowed to pass through the cells of the silica membrane

TABLE 2

|  | Silica membrane Pores of 1 nm or more | Pervaporation test | | |
|---|---|---|---|---|
|  |  | Ethanol permeation amount [kg/m$^2$·h] | Permeated ethanol concentration [mass %] | Judgment |
| Example 1 | Present | 3.1 | 50 | B |
| Example 2 | Present | 2.0 | 53 | B |
| Example 3 | Present | 8.8 | 56 | A |
| Example 4 | Present | 2.5 | 99 | A |
| Example 5 | Present | 3.1 | 98 | A |
| Example 6 | Present | 4.2 | 87 | A |
| Example 7 | Present | 8.6 | 66 | A |

TABLE 2-continued

| | Silica membrane Pores of 1 nm or more | Pervaporation test | | |
| --- | --- | --- | --- | --- |
| | | Ethanol permeation amount [kg/m² · h] | Permeated ethanol concentration [mass %] | Judgment |
| Example 8 | Present | 3.7 | 90 | A |
| Example 9 | Present | 4.9 | 55 | A |
| Example 10 | Present | 11.5 | 79 | A |
| Example 11 | Present | 10.9 | 55 | A |
| Example 12 | Present | 8.7 | 52 | B |
| Example 13 | Present | 10.1 | 51 | B |
| Example 14 | Present | 2.0 | 99 | B |
| Example 15 | None | 2.3 | 92 | B |
| Comparative Example 1 | Present | 0.2 | 48 | C |
| Comparative Example 2 | Present | 2.2 | 21 | C |

Examples 2 to 15 and Comparative Examples 1 and 2

Figure 2:
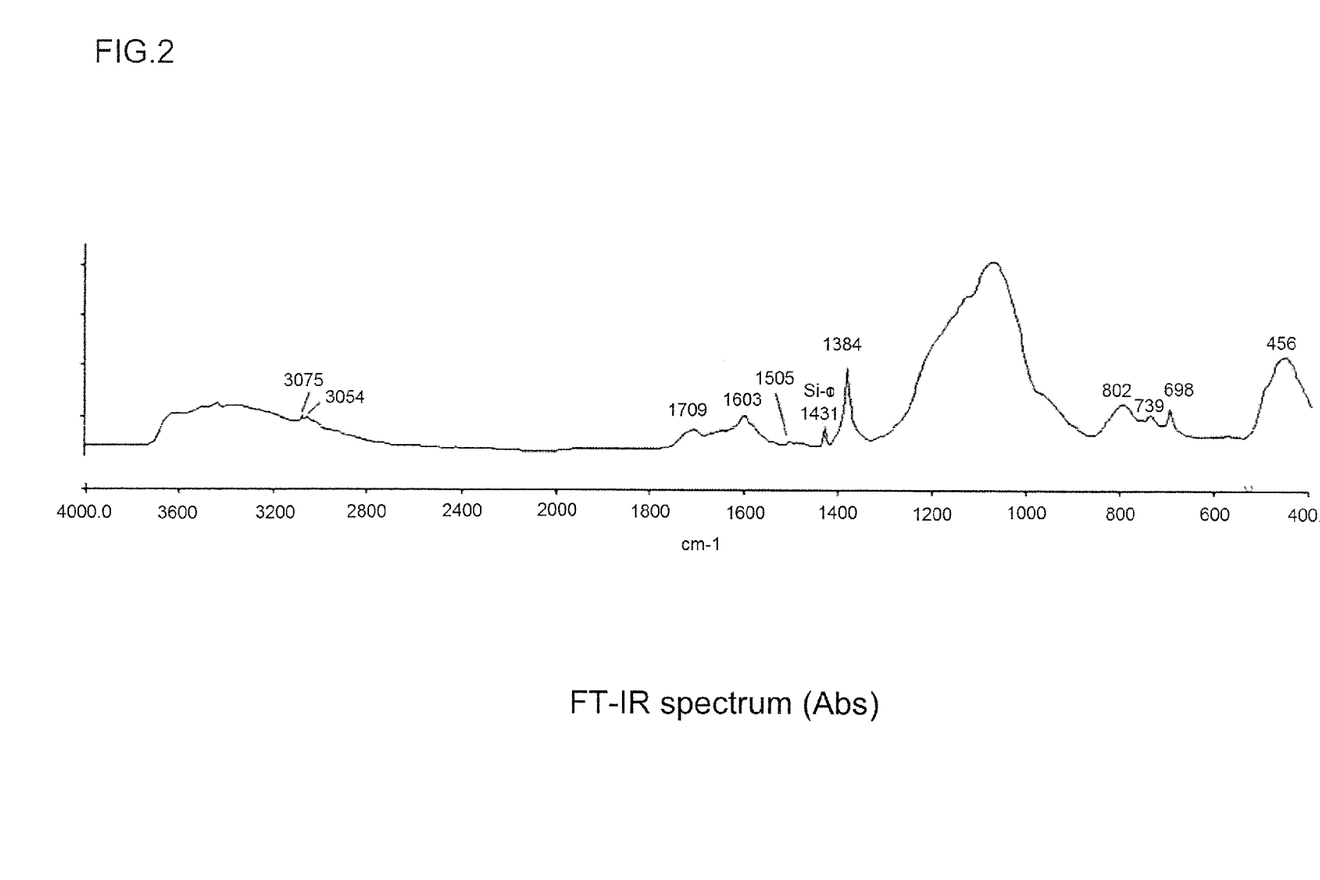
FIG. 2 shows a result obtained by performing Fourier transform infrared spectrometry (FT-IR) of a silica membrane filter of Example 7.
Figure 3:
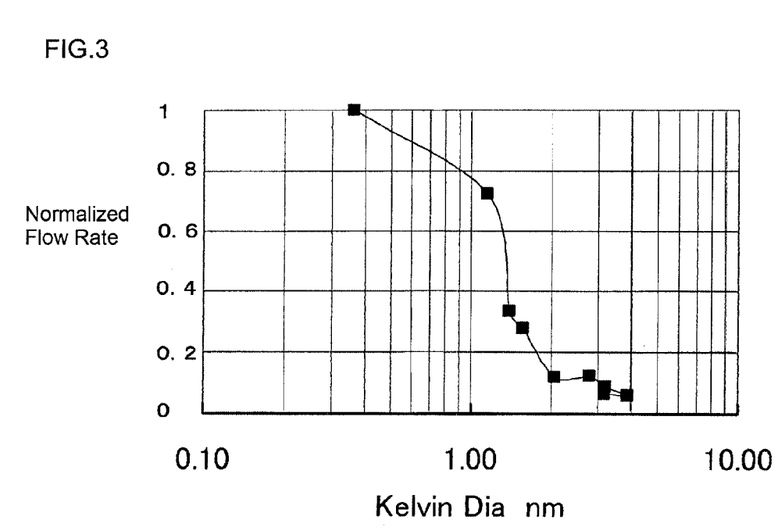
FIG. 3 shows a result obtained by performing pore diameter distribution measurement of a silica membrane filter of Example 6.

The procedures of Example 1 were repeated except that respective conditions were changed as shown in Table 1, to prepare silica membrane filters. In the same manner as in Example 1, "pore diameter measurement of a silica membrane" and "a pervaporation test" were carried out by the above methods. The results are shown in Table 2. Furthermore, the pore diameter distribution measurement of the silica membrane of the silica membrane filter of Example 6 was carried out. FIG. 3 shows the result of the pore diameter distribution measurement of the silica membrane filter of Example 6. It is suggested from FIG. 3 that a permeation speed lowers at 1 to 2 nm and hence pores of 1 to 2 nm are present. Furthermore, it has been confirmed by "Fourier transform infrared spectrometry (FT-IR)" described in the following that the silica membrane of the silica membrane filter of Example 7 contains a p-tolyl group. FIG. 2 shows the result of the Fourier transform infrared spectrometry (FT-IR).

It is seen from Tables 1, 2 that in Examples 1 to 15, "judgment" is "A" or "B" and the pervaporation test has a suitable result. It is seen that in Comparative Example 1, the residual ratio of the dried membrane after the firing is as high as 90 mass %, and hence the ethanol permeation amount becomes smaller. Furthermore, it is seen that in Comparative Example 2, the residual ratio of the dried membrane after the firing is as low as 30 mass %, and hence the permeated ethanol concentration becomes lower.

(Fourier Transform Infrared Spectrometry (FT-IR))

The procedures of Example 7 were repeated except that instead of "applying a precursor sol to a monolithic ceramic substrate", "a KBr substrate was coated with the precursor sol by a spin coating method", to prepare a silica membrane filter. Measurement was carried out by a permeation method in which Spectrum 2000 of Perkin Elmer Co., Ltd. was used.

(Pore Diameter Distribution Measurement)

Pore diameter distribution measurement of the silica membrane filter was carried out by using DYNAMIC PORE SIZE MEASUREMENT manufactured by SRI International.

INDUSTRIAL APPLICABILITY

A method for manufacturing a silica membrane filter of the present invention can be utilized as a method for manufacturing a silica membrane filter having a function of selectively separating an alcohol from a mixture of a hydrocarbon and the alcohol.

DESCRIPTION OF REFERENCE NUMERALS

1: precursor sol, 3: porous substrate, 5: cell, 7: partition wall, 9: inner wall surface, and 11: masking tape.

The invention claimed is:

1. A method for manufacturing a silica membrane filter, comprising:
performing, at least once, a fired membrane forming operation having: a membrane forming step of applying, to a porous substrate, a precursor sol which is a sol of a silicon alcoxide including a p-tolyl group to form a precursor sol membrane; a drying step of drying the precursor sol membrane formed in the porous substrate to form a dried membrane; and a firing step of firing the dried membrane formed in the porous substrate to form a fired membrane, thereby preparing the silica membrane filter comprising the porous substrate and a silica membrane which is the fired membrane formed in the porous substrate,
wherein a ratio of a total mass of the silica membrane to a total mass of the dried membrane is 38 mass % or more and 85 mass % or less,
wherein an average value of opening diameters in a plurality of pores that are open in a surface of the porous substrate is from 3 to 10 nm, and
wherein the silica membrane filter is subjected to a pervaporation test of passing a mixed liquid of ethanol, o-xylene and n-octane in a mass ratio of 33:33:33 through the silica membrane at a temperature of 50° by reducing the pressure from a side surface of the porous substrate at a vacuum degree of about 10 Torr, and trapping vapor permeated through the silica membrane filter to the side of the porous substrate in a trap cooled by liquid nitrogen, resulting in an ethanol permeation amount of at least 3.7 kg/m²·h and a permeated ethanol concentration of at least 79 mass %.

2. The method for manufacturing the silica membrane filter according to claim 1, wherein the mass of the silica membrane is from 0.5 to 7.2 g/m² per unit membrane area.

3. The method for manufacturing the silica membrane filter according to claim 2, wherein a firing temperature in the firing step is from 375 to 525° C.

4. The method for manufacturing the silica membrane filter according to claim 3, wherein the silica membrane is porous and has at least one pore having a pore diameter of 1 nm or more.

5. The method for manufacturing the silica membrane filter according to claim 2, wherein the silica membrane is porous and has at least one pore having a pore diameter of 1 nm or more.

6. The method for manufacturing the silica membrane filter according to claim 1, wherein a firing temperature in the firing step is from 375 to 525° C.

7. The method for manufacturing the silica membrane filter according to claim 6, wherein the silica membrane is porous and has at least one pore having a pore diameter of 1 nm or more.

8. The method for manufacturing the silica membrane filter according to claim 1, wherein the silica membrane is porous and has at least one pore having a pore diameter of 1 nm or more.

9. A silica membrane filter which is manufactured by the method for manufacturing the silica membrane filter according to claim 1.

* * * * *